(No Model.)
C. SPOFFORD.
MACHINE FOR SAWING METAL.
No. 486,169. Patented Nov. 15, 1892.
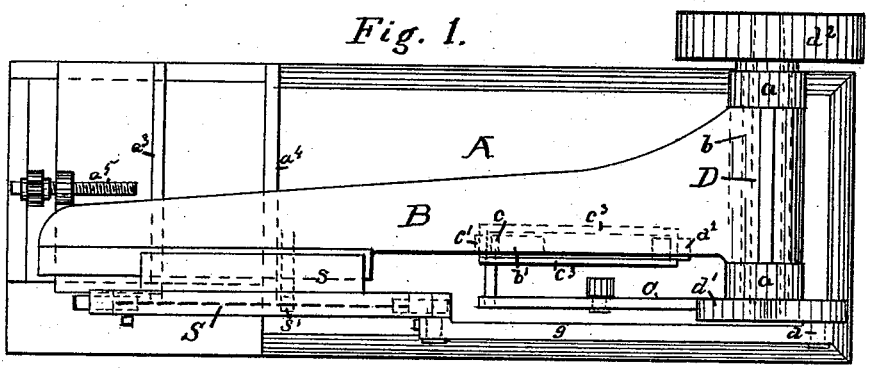
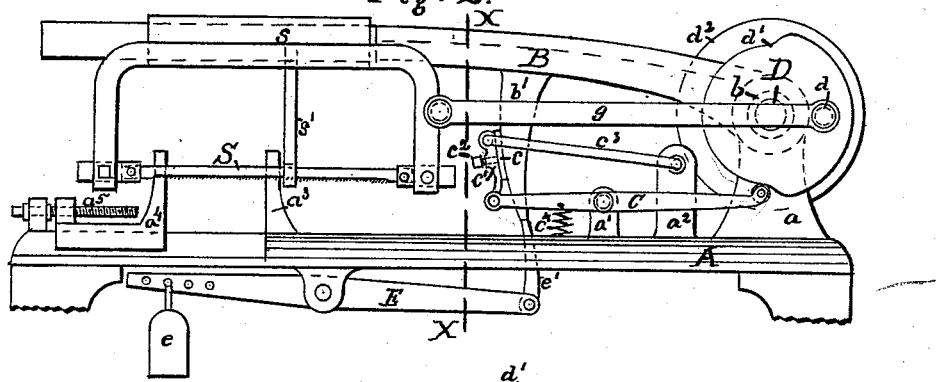
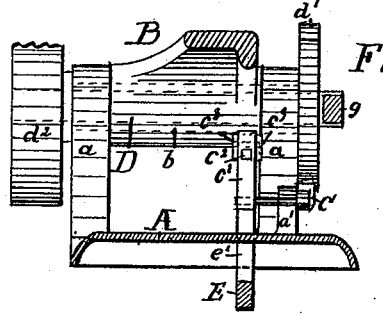
WITNESSES
INVENTOR
Charles Spofford

UNITED STATES PATENT OFFICE.

CHARLES SPOFFORD, OF NEW YORK, N. Y.

MACHINE FOR SAWING METAL.

SPECIFICATION forming part of Letters Patent No. 486,169, dated November 15, 1892.

Application filed June 20, 1892. Serial No. 437,417. (No model.)

*To all whom it may concern:*

Be it known that I, CHARLES SPOFFORD, a citizen of the United States, and a resident of New York, in the county of New York and State of New York, have invented certain new and useful Improvements in Machines for Sawing Metal, of which the following is a specification.

My invention relates more particularly to machines for sawing metal, in which the saw has a vibratory or reciprocating motion; and it consists of such mechanism and devices as shall lift the saw from the metal during the return or back stroke, thereby saving the cutting-edges of the saw-teeth from much useless wear and conducing to quicker and better results in cutting on the forward stroke and also to greater durability of the saw.

In the accompanying drawings, Figure 1 is a side elevation of a metal-sawing machine with my improvements. Figure 2 is a plan view of the same. Fig. 3 is a vertical section on line X X.

The same letters refer to the same parts.

In machines for sawing metal which use a reciprocating saw or cutter the saw should have sufficient weight or pressure on the work to make it "bite" or cut well on the forward stroke, but should be lifted or relieved of such pressure on the return or non-cutting portion of the movement. I attain this result by means of the following mechanism: The saw S is mounted upon a sliding carriage $s$, which travels to and fro on a swinging arm B and can be raised and lowered therewith. The arm B is fitted to swing or rotate around a sleeve or bushing $b$, which surrounds the driving-shaft D and acts as the journal-box thereof. The bushing $b$ is supported in bearings or pillar-blocks $a\ a$ on the bed A, to which they are secured. The shaft D carries at one end the crank $d$, which gives the necessary reciprocating movement to the saw S by means of the connecting-rod or pitman $g$. The periphery of the crank-plate is formed into a cam $d'$, which by its revolution oscillates the lever C, which is hung upon a suitable pedestal $a'$ on the bed A. Upon the swinging arm B is a projection $b'$, having a curved surface, the curvature of which is concentric with the arm B and bushing $b$, as shown. To this curved surface is fitted a friction shoe or clutch $c$, which is secured to a carrier $c'$ in such a manner that the pressure of the shoe $c$ upon the projection $b'$ may be regulated by a set-screw $c^2$, provided in the carrier $c'$. The carrier $c'$ is hung by flexible joints, first at its lower end to the lever C, as shown, and at its upper end by two connecting-rods $c^3\ c^3$ to a pedestal $a^2$, secured upon the bed A. The operation of this arrangement is such that when the cam $d'$ depresses the one end of the lever C the other end thereof in lifting first closes the shoe $c$ firmly upon the surface of $b'$ and then lifts both together, thus lifting the arm B, and with it the saw-frame $s$, and saw S, and holding them in the lifted position until the cam $d'$ permits the whole to drop, when the shoe $c$ leaves the surface of $b'$, permitting the whole to drop until the saw S is in contact with the material to be acted upon. Thus at each succeding stroke the shoe $c$ takes a new hold of the projection $b'$ at whatever level it may be and lifts it a definite distance while the saw is upon the back stroke. A spring $c^4$ is provided to keep the lever C up to the cam $d'$. Under the bed A is hung a lever E, having an adjustable weight $e$ and projection $e'$, as shown. The end of the projection $e'$, passing up through an opening provided in the bed-plate A, acts upon the end of $b'$, tending to lift the same, and by means of the adjustable weight $e$ regulates the proper degree of pressure of the saw S upon the work and also assists the action of the lever C and shoe $c$, as described. A saw-guide $s'$ is secured to the swinging arm B. The material to be operated upon is secured in a vise $a^3\ a^4$ by means of a screw $a^5$. The construction of this mechanism, as above described, is such that when the material is cut the swing-arm B and saw S may be lifted entirely out of the way while placing the material and adjusting the vise $a^3\ a^4$ without reference to the rest of the machine, falling back to its proper relation to the shoe $c$ and projection $e'$ without any preparation or manipulation of those parts, whether the material to be operated upon is in itself large or small. The shaft D, which by means of the crank $d$ actuates the saw S and by means of the cam $d'$ actuates the lifting mechanism, as described, is rotated by means of the pulley $d^2$ or a crank or gear, as may be preferred.

Having thus described the nature and uses of my invention, what I claim is—

1. In a machine for sawing metal, the cam $d'$, and lever C, in combination with the shoe $c$, connected by the rods $c^3$ $c^3$ to the pedestal $a^2$, and swing-arm B, having the curved surface $b'$, when constructed and operated substantially as and for the purposes herein shown and set forth.

2. In a machine for sawing metal, the swing-arm B, carrying the sliding saw-carriage $s$ and saw-guide $s'$ and having the projection $b'$, in combination with the projection $e'$ and lever E, having an adjustable weight $e$, and also with the friction-shoe $c$, lever C, spring $c^4$, and cam $d'$, when constructed and operated substantially as and for the purposes herein shown and set forth.

Signed at New York, in the county of New York and State of New York, this 18th day of June, A. D. 1892.

CHARLES SPOFFORD.

Witnesses:
   BENJ. T. PETTY,
   ALOHA VIVARTTAS.